United States Patent
Liu et al.

(10) Patent No.: US 9,116,881 B2
(45) Date of Patent: Aug. 25, 2015

(54) ROUTING SWITCH APPARATUS, NETWORK SWITCH SYSTEM, AND ROUTING SWITCHING METHOD

(71) Applicant: Huawei Technologies Co., Ltd., Shenzhen (CN)

(72) Inventors: Yunhai Liu, Shenzhen (CN); Junfeng Diao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 343 days.

(21) Appl. No.: 13/715,646

(22) Filed: Dec. 14, 2012

(65) Prior Publication Data

US 2013/0132634 A1  May 23, 2013

Related U.S. Application Data

(63) Continuation of application No. PCT/CN2011/082442, filed on Nov. 18, 2011.

(51) Int. Cl.
| | |
|---|---|
| *G06F 13/28* | (2006.01) |
| *G06F 13/40* | (2006.01) |
| *H04L 12/931* | (2013.01) |

(Continued)

(52) U.S. Cl.
CPC .............. *G06F 13/28* (2013.01); *G06F 13/387* (2013.01); *G06F 13/4004* (2013.01); *G06F 13/4022* (2013.01); *H04L 49/35* (2013.01); *G06F 13/4282* (2013.01)

(58) Field of Classification Search
CPC ... G06F 13/28; G06F 13/282; G06F 13/4004; G06F 13/4009; G06F 13/4022; G06F 13/4282; H04L 49/15–49/1153
See application file for complete search history.

(56) References Cited

U.S. PATENT DOCUMENTS

| | | | |
|---|---|---|---|
| 6,243,394 B1 * | 6/2001 | Deng | 370/466 |
| 7,082,488 B2 * | 7/2006 | Larson et al. | 710/301 |
| 7,240,130 B2 * | 7/2007 | Larson et al. | 710/29 |

(Continued)

FOREIGN PATENT DOCUMENTS

| | | |
|---|---|---|
| CN | 101222495 A | 7/2008 |
| CN | 101394349 A | 3/2009 |
| CN | 102195984 A | 9/2011 |

OTHER PUBLICATIONS

International Search Report issued in corresponding PCT Patent Application No. PCT/CN2011/082442, mailed Aug. 30, 2012.

*Primary Examiner* — Ryan Stiglic
(74) *Attorney, Agent, or Firm* — Brinks Gilson & Lione

(57) ABSTRACT

The present disclosure relates to a routing switch apparatus, a network switch system, and a routing switch method. The routing switch apparatus includes one or more direct memory access modules and at least two protocol conversion interfaces. The direct memory access module is configured to generate a continuous access request of a cross network node, and control data transmission in the at least two protocol conversion interfaces; each protocol conversion interface is configured to convert a communication protocol of data transmitted inside and outside the routing switch apparatus and connect the routing switch module and an external network node. The routing switch apparatus may be introduced to replace a network switch, so that cross-node memory access and IO space access can be performed directly rather than through a proxy, thereby reducing delay of the cross-node memory access and IO space access and improving overall performance of a system.

9 Claims, 7 Drawing Sheets

(51) Int. Cl.
  *G06F 13/38* (2006.01)
  *G06F 13/42* (2006.01)

(56) References Cited

U.S. PATENT DOCUMENTS

| | | |
|---|---|---|
| 7,398,345 B2 * | 7/2008 | Larson et al. ............... 710/306 |
| 7,937,447 B1 | 5/2011 | Cohen et al. |
| 8,745,306 B2 * | 6/2014 | Rankin et al. .............. 710/317 |
| 2004/0255070 A1 * | 12/2004 | Larson et al. .............. 710/305 |
| 2004/0255071 A1 * | 12/2004 | Larson et al. .............. 710/306 |
| 2004/0267999 A1 * | 12/2004 | Larson et al. .............. 710/301 |
| 2005/0210177 A1 * | 9/2005 | Norden .................... 710/317 |
| 2005/0238035 A1 | 10/2005 | Riley |
| 2007/0098001 A1 | 5/2007 | Thomas |
| 2008/0240103 A1 | 10/2008 | Schmidt |
| 2009/0094399 A1 * | 4/2009 | Daniel et al. .............. 710/311 |
| 2009/0319717 A1 * | 12/2009 | Rankin et al. .............. 710/317 |
| 2010/0082849 A1 | 4/2010 | Millet et al. |

* cited by examiner

ROUTING SWITCH APPARATUS, NETWORK SWITCH SYSTEM, AND ROUTING SWITCHING METHOD

CROSS-REFERENCE TO RELATED APPLICATIONS

This application is a continuation of International Application No. PCT/CN2011/082442, filed on Nov. 18, 2011, which is hereby incorporated by reference in its entirety.

FIELD

Embodiments of the present disclosure relate to the field of information technologies, and in particular, to a routing switch apparatus, a network switch system, and a routing switch method.

BACKGROUND

In the current server hardware market, computing capability and storage processing capability of a single processor are quite limited. However, in some special application scenarios, both the processing capability and memory capacity of a server are highly required, such as the processing of an accounting system of a bank, or the database processing of a communication exchange center, or analytical processing of meteorological information. In order to satisfy these special applications, multiple processors are often required to be connected together to form a large-scale computing system, which involves interconnection of processors or computing systems. Usually, the multiple processors or computing systems may be connected in two methods, one is to connect the multiple processors through a special protocol, and the other is to connect multiple small computing systems to form a large computing system through a general protocol (such as a PCIE (Peripheral Component Interconnect Express, peripheral component interconnect express)).

For the computing system which adopts the general protocol, if the processor of a network node needs to access a memory or an input/output (Input/Output, abbreviated as IO) space of another network node, the network node needs to send relevant commands and parameters to the another network node through a network protocol, and the processor of the another network node executes relevant access commands instead, but efficiency; in this way, efficiency and speed of the cross-node memory access and IO space access are very low, thereby seriously affecting system performance.

SUMMARY

Embodiments of the present disclosure provide a routing switch apparatus, a network switch system, and a routing switch method, which can solve a delay problem of cross-node memory and IO space access.

In one aspect, a routing switch apparatus is provided, which includes one or more direct memory access DMA (Direct Memory Access) modules and at least two protocol conversion interfaces. The DMA module is configured to generate a continuous access request of a cross network node, and control data transmission in the at least two protocol conversion interfaces. Each protocol conversion interface is configured to convert a communication protocol of data transmitted inside and outside the routing switch apparatus and connect a routing switch module and an external network node.

In another aspect, a network switch system is provided, which includes at least two server nodes and one or more routing switch apparatuses. Each routing switch apparatus is connected to the at least two server nodes or another routing switch apparatus through a fast bus link (Fast Bus Link) and includes one or more DMA modules and at least two protocol conversion interfaces. The DMA module is configured to generate a continuous access request of a cross network node, and control data transmission in the at least two protocol conversion interfaces. Each protocol conversion interface is configured to convert a communication protocol of data transmitted inside and outside the routing switch apparatus and connect a routing switch module and an external network node.

In still another aspect, a routing switch method executed by a routing switch apparatus is provided. The routing switch apparatus at least includes a DMA module, a first protocol conversion interface, and a second protocol conversion interface. The first protocol conversion interface and the second protocol conversion interface are respectively configured to convert a communication protocol of data transmitted inside and outside the routing switch apparatus. The method includes: acquiring, by the DMA module, configuration information and an access parameter through a configuration interface; sending, by the DMA module, a read request through the first protocol conversion interface to a network node which is connected to it, and reading out transmitted data from the network node; and transmitting, by the DMA module, the acquired transmitted data to the second protocol conversion interface, transmitting, through the second protocol conversion interface, a write request to a network node which is connected to it, and writing the transmitted data in the network node which is connected to the second protocol conversion interface.

In yet another aspect, a routing switch method in a network switch system is provided. The network switch system includes at least two server nodes and one or more routing switch apparatuses. Each routing switch apparatus is respectively connected to the at least two server nodes or another routing switch apparatus through a fast bus link, and the at least two server nodes include a first server node and a second server node. The method includes: transmitting an access parameter to the routing switch apparatus through a configuration interface and starting the routing switch apparatus to begin working; controlling, by the routing switch apparatus, the first server node to perform read and write operations on the second server node; and when the read and write operations which are performed on the second server node by the first server node are finished, stopping, by the routing switch apparatus, data exchange between the first server node and the second server node.

In the embodiments of the present disclosure, the routing switch apparatus may be introduced to replace a network switch, so that cross-node memory access and IO space access can be performed directly without a proxy, thereby reducing delay of the cross-node memory access and IO space access and improving overall performance of a system.

BRIEF DESCRIPTION OF THE DRAWINGS

To illustrate the technical solutions of the embodiments of the present disclosure more clearly, the accompanying drawings required for describing the embodiments or the prior art are introduced briefly in the following. Apparently, the accompanying drawings in the following descriptions are only some embodiments of the present disclosure, and persons of ordinary skill in the art can still derive other drawings according to these accompanying drawings without creative efforts.

DETAILED DESCRIPTION OF THE EMBODIMENTS

The technical solutions of the embodiments of the present disclosure will be clearly and completely described in the following with reference to the accompanying drawings in the embodiments of the present disclosure. Apparently, the embodiments to be described are only a part rather than all of the embodiments of the present disclosure. All other embodiments obtained by persons of ordinary skill in the art based on the embodiments of the present disclosure without creative efforts shall fall within the protection scope of the present disclosure.

Figure 1:
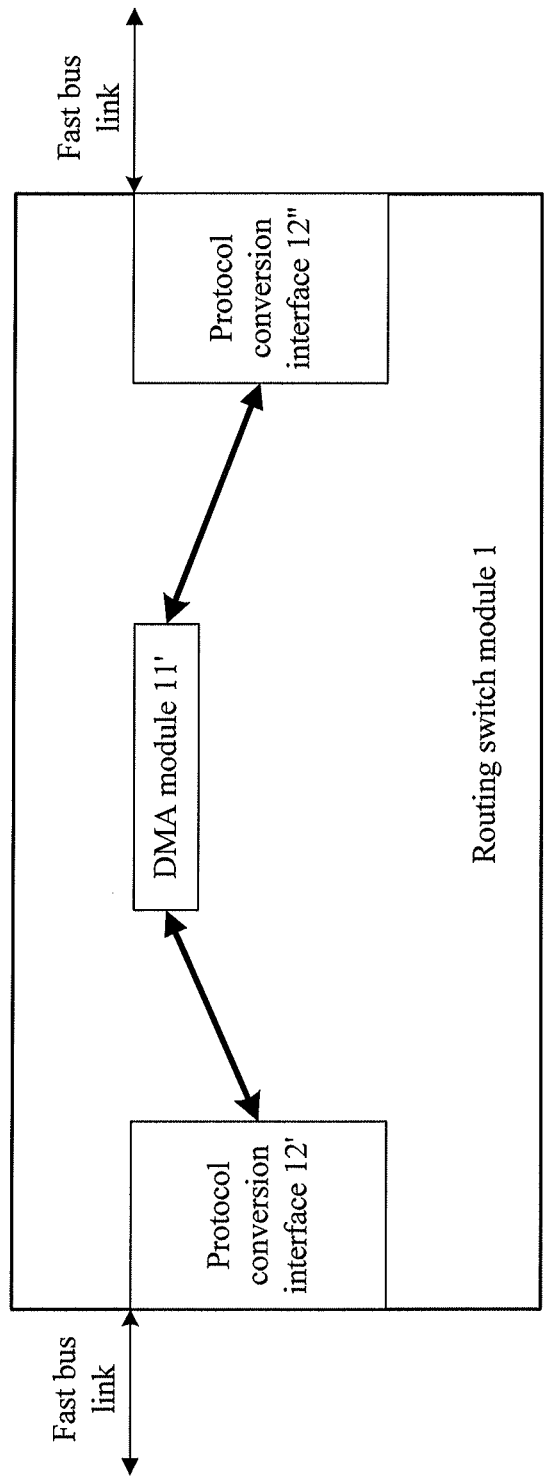
FIG. 1 is a schematic structural diagram of a routing switch apparatus according to an embodiment of the present disclosure.

FIG. 1 shows a routing switch apparatus according to an embodiment of the present disclosure. The routing switch apparatus is a hardware device which can connect multiple network nodes. Here the network node may be a server node, or may be another routing switch apparatus.

In FIG. 1, a routing switch apparatus 1 includes one or more DMA modules 11 and at least two protocol conversion interfaces 12. In FIG. 1, only a DMA module and two protocol conversion interfaces are schematically shown, that is, a DMA module 11', a protocol conversion interface 12' and a protocol conversion interface 12". Persons skilled in the art easily understand that a routing switch module 1 may be designed to possess more than one DMA module and more than two protocol conversion interfaces according to application requirements. Generally, the DMA module 11' may generate an access request of a cross network node, and then control data transmission between the two protocol conversion interfaces 12' and 12". The protocol conversion interface 12' and the protocol conversion interface 12" perform conversion, so as to convert a communication protocol of data from an external network node into a communication protocol required by internal data transmission of the routing switch apparatus 1 or convert the communication protocol required by the internal data transmission of the routing switch apparatus 1 into the communication protocol of data from the external network node, and connect the routing switch apparatus 1 and the external network node.

Figure 2:
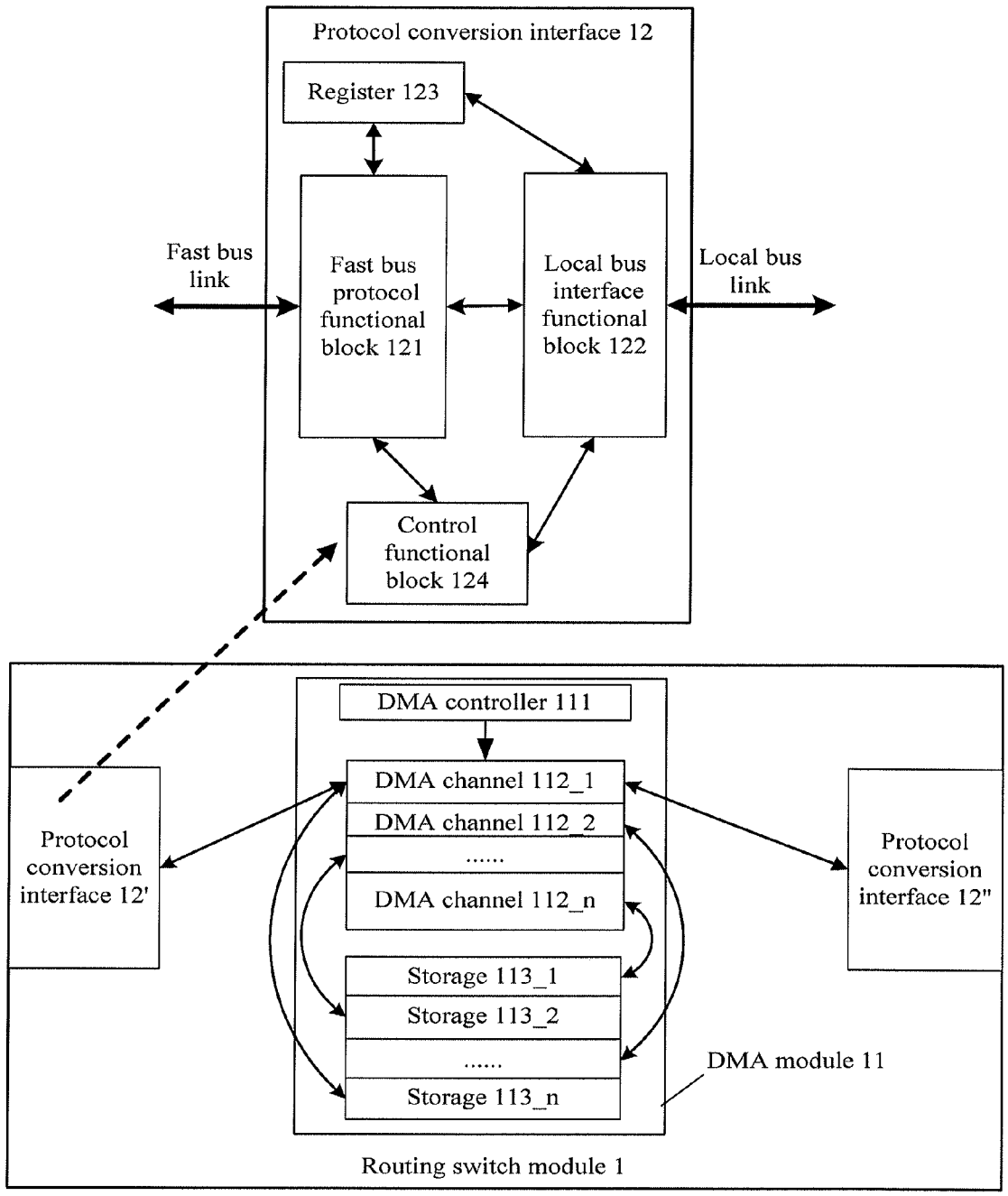
FIG. 2 is a schematic structural diagram of a DMA module and a protocol conversion interface in a routing switch apparatus according to an embodiment of the present disclosure.

FIG. 2 is an exemplary internal structural diagram of the DMA module 11 and the protocol conversion interface 12.

For example, in FIG. 2, the DMA module 11 includes a DMA controller 111 and multiple DMA channels 112. The DMA controller 111 controls a connection between a DMA channel 112 and the protocol conversion interface 12 according to configuration information. Moreover, the DMA module 11 may further include multiple storages 113, and the storages 113 are usually used as buffers of the DMA channels 112. For example, for convenience of understanding, FIG. 2 shows one-to-one correspondence between the storages 113 and the DMA channels 112, a DMA channel 112_1 to a DMA channel 112_n, and a storage 113_1 to a storage 113_n. Definitely, the storages 113 may not be one-to-one corresponding to the DMA channels 112. All the DMA channels 112 have the same function and configuration and all the storages 113 may also have the same function and configuration. For example, the storage 113 may be a register or a RAM (random access memory, random access memory), its data capacity may be 2 bytes, 4 bytes, 8 bytes, or 32 bytes, and its capacity is not limited by the present disclosure. When a speed difference between two network nodes in transmitting data through a DMA channel 112 is obvious, the storage 113 may be used for data buffering, so as to avoid transmission congestion.

The protocol conversion interface 12 includes a fast bus protocol functional block 121, a local bus interface functional block 122, a register 123 and a control functional block 124. For example, the fast bus protocol functional block 121 performs data exchange with the external network node through a fast bus link. The fast bus protocol functional block 121 is a functional module to implement and support a fast bus link protocol so as to ensure that data transmission may be performed among each network node through the fast bus link. The so-called fast bus protocol is a general protocol that the routing switch apparatus 1 is connected to each network node to perform the data transmission, such as a PCIE protocol and its upgrade, or other general protocols. The fast bus protocol functional block 121 is a transmission channel for commands and data between the network nodes and the routing switch apparatus 1 and may also be used to configure and manage the routing switch apparatus. The local bus interface functional block 122 is connected to the fast bus protocol functional block 121, and is used for data transmission inside the routing switch apparatus 1. Therefore, the data is guaranteed to be transmitted from one network node to another network node correctly. The register 123 is connected to the fast bus protocol functional block 121 and the local bus interface functional block 122, and stores instructions which are used to configure the fast bus protocol functional block 121 and the local bus interface functional block 122, so as to configure the fast bus protocol functional block 121, the local bus interface functional block 122 and other functional blocks inside the protocol conversion interface 12. The control functional block 124 is connected to the fast bus protocol functional block 121 and the local bus interface functional block 122, and is used to control the performance or operation of the protocol conversion interface 12, such as power consumption management or hot-plugging management.

In conclusion, the protocol conversion interface 12 is configured to perform conversion between two protocols to implement the data transmission among different entities. A format of information formats flowing from a protocol conversion interface 12 to each network node or flowing from each network node to another protocol conversion interface 12 and a method for information transmission must meet the requirement of a protocol. When the data transmission is performed inside the routing switch apparatus 1, an internal data transmission protocol is used, and different data transmission protocols may be adopted in different embodiments. The protocol conversion interface 12 has two major objectives: the first is to perform communication protocol conversion between the network node and the routing switch apparatus 1; and the second is to separate an internal resource space of the routing switch apparatus 1 from the space of each network node to enable each network node and the routing switch apparatus 1 to be entities independent from each other, even if the fast bus link protocol is also supported inside the routing switch apparatus 1.

Through the protocol conversion interface 12, the routing switch apparatus 1 may be connected to multiple network nodes. In the same way, multiple routing switch apparatuses 1 may be cascaded together through the protocol conversion interface 12, thereby forming a larger routing switch apparatus network.

It should be noted that, the division of the internal functional modules of the routing switch apparatus 1 as shown in FIG. 2 is only for the convenience of description, which does not indicate that the routing switch apparatus 1 can only be formed by these functional modules, the routing switch apparatus 1 may also include other functional modules, and the functional blocks as shown in the diagram may be combined or divided to form a new functional module. These changes all fall within a coverage scope of the present disclosure.

A network switch system according to an embodiment of the present disclosure is described in the following with reference to FIG. 3.

Figure 3:
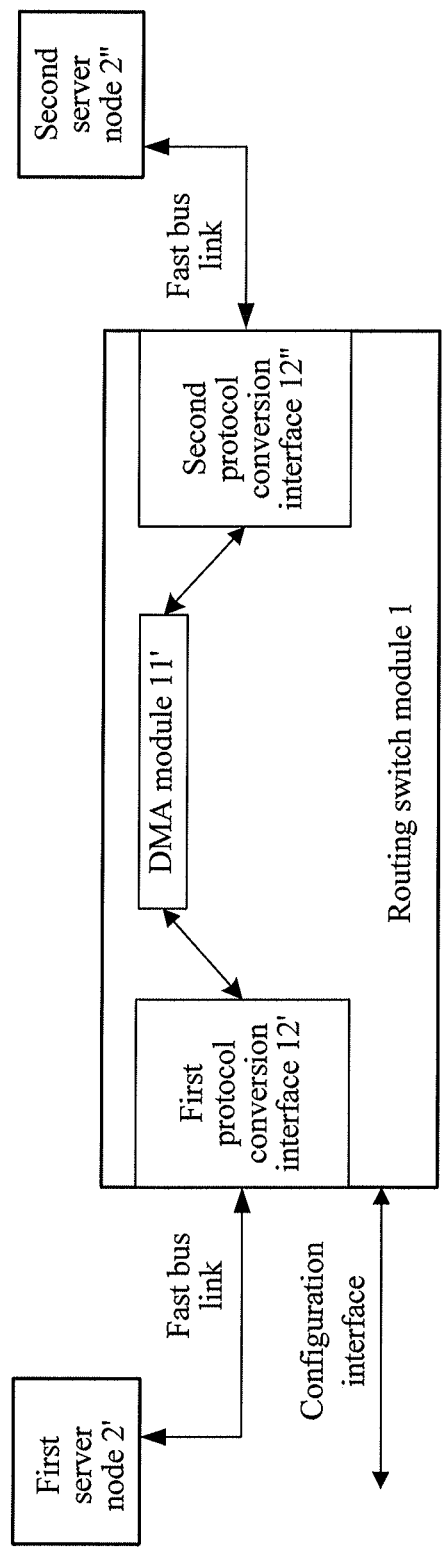
FIG. 3 is a schematic structural diagram of a network switch system according to an embodiment of the present disclosure.

In FIG. 3, a network switch system 3 includes at least two server nodes 2 and one or more routing switch apparatuses 1. Each routing switch apparatus 1 is connected to the server node 2 or another routing switch apparatus 1 through a fast bus link. For example, a first server node 2' and a second server node 2" are shown in FIG. 3. The routing switch apparatus 1 includes at least one DMA module 11, such as a DMA module 11', and the DMA module 11' controls data transmission between the first server node 2' and the routing switch apparatus 1, and between the second server node 2" and the routing switch apparatus 1. The first protocol conversion interface 12' is connected to the first server node 2' through the fast bus link, and converts a communication protocol of data transmitted between the first server node 2' and the DMA module 11'. The second protocol conversion interface 12" is connected to the second server node 2" through the fast bus link, and converts a communication protocol of data transmitted between the second server node 2" and the DMA module 11'.

It may be considered to design a slot complying with fast bus standards on each server node 2 or also design a slot complying with the fast bus standards on each routing switch apparatus 1. In this way, a link cable with plugs at one end or at two ends may be adopted according to requirements to connect a network node and the routing switch apparatus 1.

Figure 4:
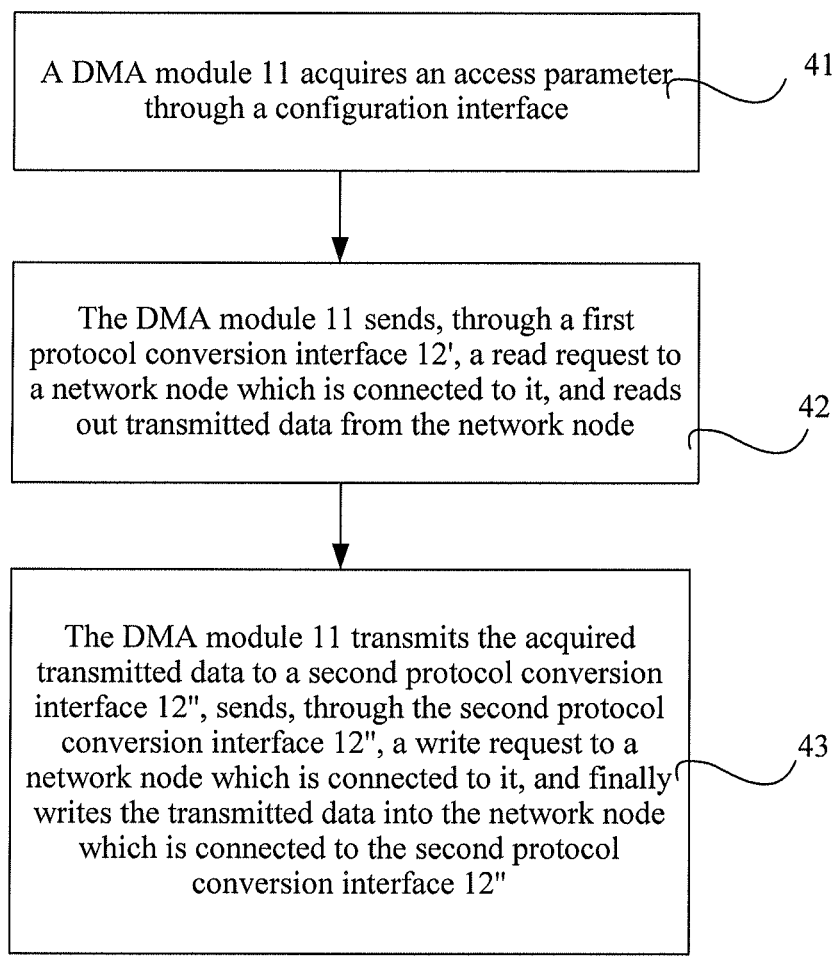
FIG. 4 is a flow chart of a routing switch method executed by a routing switch apparatus according to an embodiment of the present disclosure.

FIG. 4 shows a routing switch method executed by a routing switch apparatus 1 according to an embodiment of the present disclosure. The routing switch apparatus 1 at least includes a DMA module 11, a first protocol conversion interface 12', and a second protocol conversion interface 12". The routing switch method executed by the routing switch apparatus 1 includes the following steps.

41: The DMA module 11 acquires an access parameter through a configuration interface.

The configuration interface may be a fast bus protocol interface or other types of interfaces such as a system management bus SMBus (System Management Bus) interface, and configuration information may also be acquired through the configuration interface.

Generally, the configuration information includes information required for configuring the routing switch apparatus 1, such as a working frequency, a working manner, a data transmission type, channel selection, and DMA module selection. The access parameter may include a starting address of a network node (such as a server node) from which data is read, the size of the data, and a data buffer of a network node into which the data is written.

After acquiring the configuration information and access information through the configuration interface, the routing switch apparatus 1 may perform configuration on itself according to the configuration information, and at the same time, content such as information of an external network node which is involved in data access is determined.

42: And then, the DMA module 11 sends a read request through the first protocol conversion interface 12' to a network node which is connected to it, and reads out transmitted data from the network node.

43: Then, the DMA module 11 transmits the acquired transmitted data to the second protocol conversion interface 12", sends a write request through the second protocol conversion interface 12" to a network node which is connected to it, and finally writes the transmitted data in the network node which is connected to the second protocol conversion interface 12".

In FIG. 4, only a process of implementing, by the DMA module 11, the first protocol conversion interface 12', and the second protocol conversion interface 12", the routing switch method is schematically described. Persons skilled in the art easily understand that the routing switch apparatus 1 may include more than two protocol conversion interfaces and multiple DMA modules 11, and different DMA modules 11 may be combined with different protocol conversion interfaces, so as to implement parallel processing, thereby further improving processing speed of the routing switch apparatus 1.

In order to simplify the description, the following description still takes a DMA module 11 plus two protocol conversion interfaces 12' and 12" as an example. It should be understood that, in the routing switch apparatus 1, any DMA module and a data access operation between the two protocol conversion interfaces which are associated with the DMA module are basically the same as the case described here.

It is supposed here that the first protocol conversion interface 12' is electrically connected to a network node (such as a first server node), and the second protocol conversion interface 12" is electrically connected to another network node (such as a second server node). In a case that the second server node needs to read data in the first server node or in a case that the first server node needs to write data into the second server node, the DMA module 11 in the routing switch apparatus 1 sends the read request through the first protocol conversion interface 12' to the first server node which is connected to it, so as to read out the transmitted data from the first server node. After the transmitted data is transmitted back to the routing switch apparatus 1 through the first protocol conversion interface 12' and is transmitted to the second protocol conversion interface 12" through the DMA module 11, the DMA module 11 sends the write request through the second protocol conversion interface 12" to the second server node which is connected to it, and finally writes the transmitted data into the second server node which is connected to the second protocol conversion interface 12".

In the foregoing process, persons skilled in the art can understand that expressions of "first" and "second" are merely used for convenience of the description rather than appointing specific components. In a case that the first server node needs to read data in the second server node or in a case that the second server node needs to write data into the first server node, in the routing switch apparatus 1, the DMA module 11 may send the read request to the second server node through the second protocol conversion interface 12" and read out the transmitted data, and then send the write request to the first server node through the first protocol conversion interface 12' and write the transmitted data, so as to implement a process of data access Further, for the DMA module 11, the DMA module 11 includes a DMA controller 111 and a DMA channel 112, as shown in FIG. 2 and FIG. 3, where the DMA controller 111 controls connections between the DMA channel 112 and the first protocol conversion interface 12', and between the DMA channel 112 and the second protocol conversion interface 12" according to configuration information. Persons skilled in the art may understand that, after the DMA module 11 of the routing switch apparatus 1 determines, according to a received access parameter, a network node where data access is required to be performed, the DMA controller 111 configures a DMA channel 112 for the data access and enables the DMA channel 112 to be connected to two protocol conversion interfaces through an internal bus, where the two protocol conversion interfaces are respectively connected to the network nodes where data access is required to be performed.

In conclusion, the routing switch method of the data access implemented by the routing switch apparatus 1 is to firstly acquire necessary configuration information and access parameters. Here the configuration information and access parameters are not necessarily provided by the foregoing first server node and second server node which need to transmit data, and may also be provided by other network nodes or devices. Then, in the routing switch apparatus 1, the DMA module 11 sends the read request through a protocol conversion interface to the network node that can provide the transmitted data and reads relevant data, and sends the write request through another protocol conversion interface to the network node which needs the transmitted data and writes the read data, so that the routing switch method of data access is implemented. Therefore, in the embodiment of the present disclosure, in the routing switch method executed by the routing switch apparatus, the routing switch apparatus replaces a network switch in the prior art, so that cross-node memory access and IO space access are enabled to be directly performed rather than through a proxy, thereby reducing the delay of the cross-node memory access and IO space access, and improving overall performance of the system.

Figure 5:
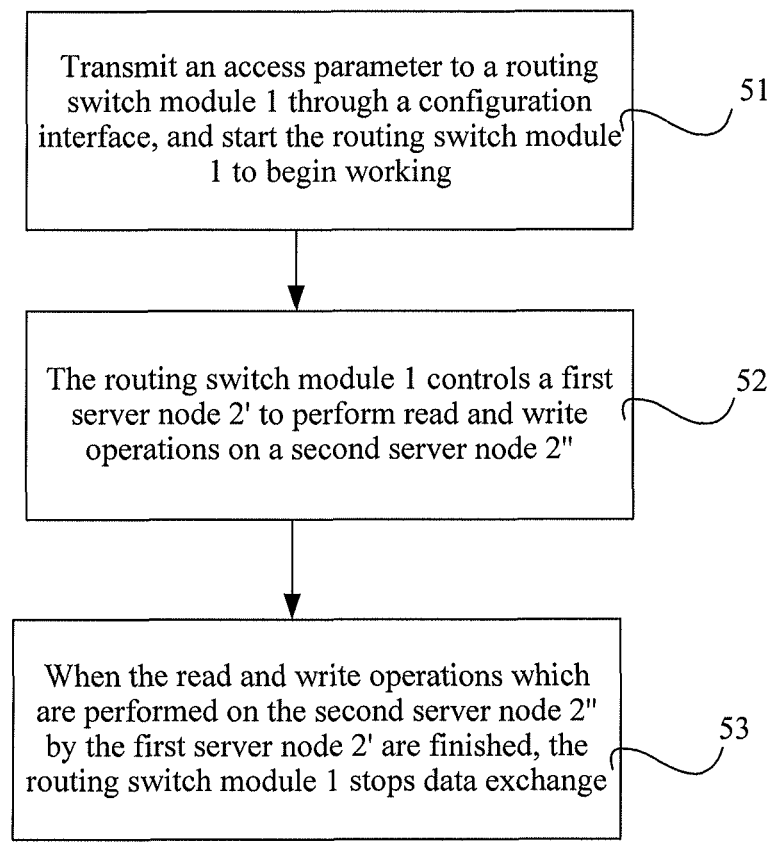
FIG. 5 is a flow chart of a routing switch method in a network switch system according to an embodiment of the present disclosure.

A routing switch method in a network switch system with entities such as a network node and a routing switch apparatus is respectively described in the following with reference to FIG. 5 to FIG. 7. The network switch system includes at least two server nodes and one or more routing switch apparatuses. Each routing switch apparatus is respectively connected to the at least two server nodes or the another routing switch apparatus through a fast bus link. In the following, a simplest network switch system which merely involves a routing switch apparatus and two network nodes (that is, a first server node and a second server node), such as the network switch system as shown in FIG. 3, is taken as an example to illustrate a process in which how each entity in the network switch system implements the routing switch method. The following steps may be included:

51: Transmit an access parameter to a routing switch apparatus 1 through a configuration interface and start the routing switch apparatus 1 to begin working;

52: Then, the routing switch apparatus 1 controls a first server node 2' to perform read and write operations on a second server node 2"; and 53: Finally, when the read and write operations which are performed on the second server node 2" by the first server node 2' are finished, the routing switch apparatus 1 stops data exchange between the first server node 2' and the second server node 2".

After the routing switch apparatus 1 stops the data exchange between the first server node 2' and the second server node 2", the routing switch apparatus 1 notifies the first server node 2' that the data read and write operations are finished, so that the first server node 2' ends the data access operation.

As shown in FIG. 3, the routing switch apparatus 1 at least includes a DMA module 11, a first protocol conversion interface 12' and a second protocol conversion interface 12". The first protocol conversion interface 12' is connected to the first server node 2' through the fast bus link, and the second protocol conversion interface 12" is connected to the second server node 2" through the fast bus link. Further, the DMA module 11 includes a DMA controller 111 and a DMA channel 112. The DMA controller 111 controls connections between the DMA channel 112 and the first protocol conversion interface 12', and between the DMA channel 112 and the second protocol conversion interface 12" according to configuration information.

Therefore, that the routing switch apparatus 1 controls the first server node 2' to perform the read and write operations on the second server node 2" includes: the DMA module 11 reads out data from the second server node 2" continuously through the second protocol conversion interface 12" and writes the read data into the first server node 2' through the first protocol conversion interface 12' until all the data is read out from the second server node 2"; or the DMA module 11 continuously reads out data from the first server node 2' through the first protocol conversion interface 12' and writes the read data into the second server node 2" through the second protocol conversion interface 12' until all the data is written into the second server node 2".

Figure 6:
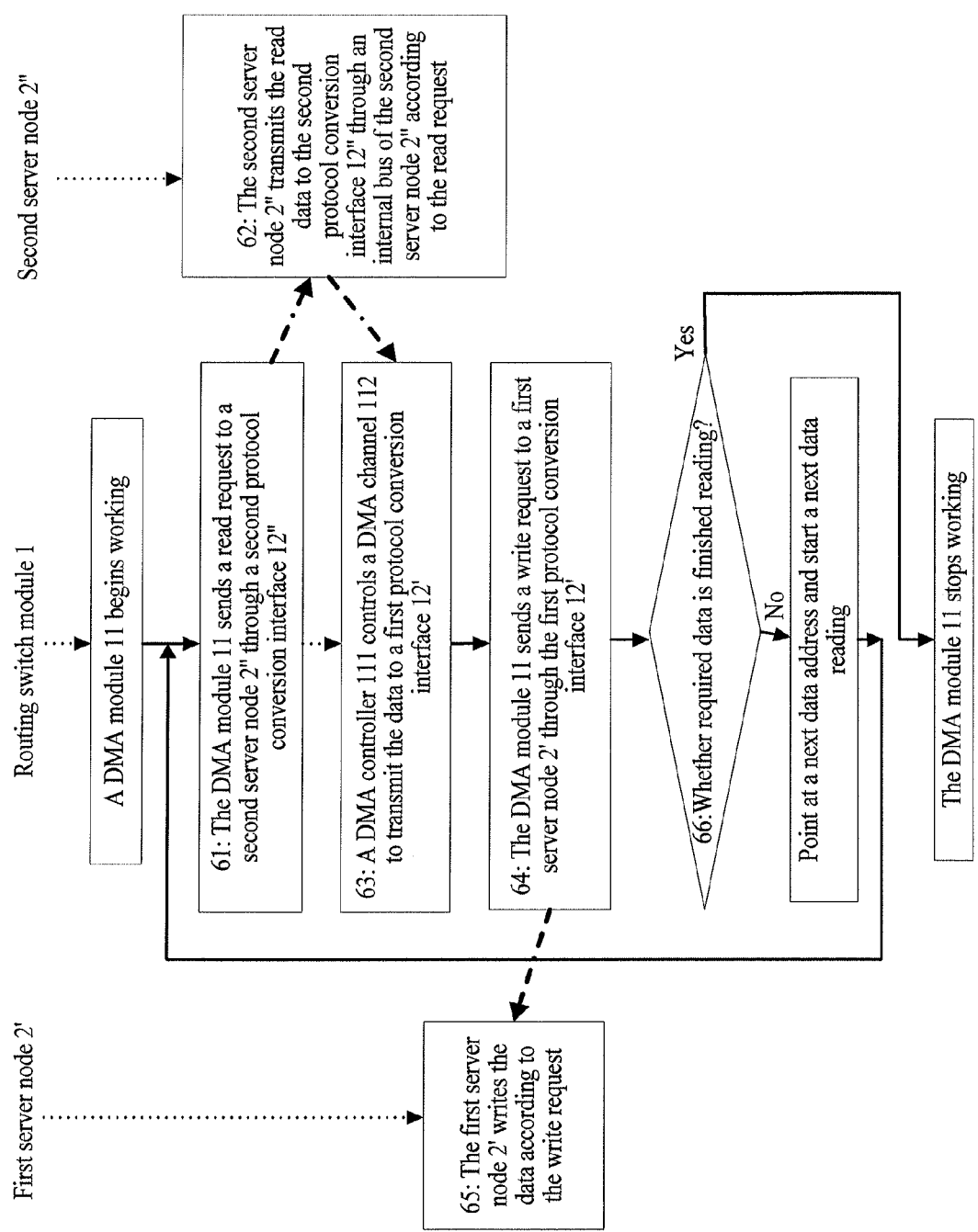
FIG. 6 is a flow chart of implementing data read access through a routing switch apparatus according to an embodiment of the present disclosure.

For example, the process that the first server node 2' reads the data from the second server node 2" through the routing switch apparatus 1 includes the following steps, as shown in FIG. 6. 61: The DMA module 11 sends a read request to the second server node 2" through the second protocol conversion interface 12". 62: The second server node 2" transmits the read data to the second protocol conversion interface 12" through an internal bus of the second server node 2" according to the read request. 63: The DMA controller 111 controls the DMA channel 112 to transmit the data to the first protocol conversion interface 12'. And then, 64: The DMA module 11 sends a write request to the first server node 2' through the first protocol conversion interface 12'. 65: The first server node 2' writes the data according to the write request. Finally, 66: determine whether all required data is finished reading; if not, acquire next data.

Figure 7:
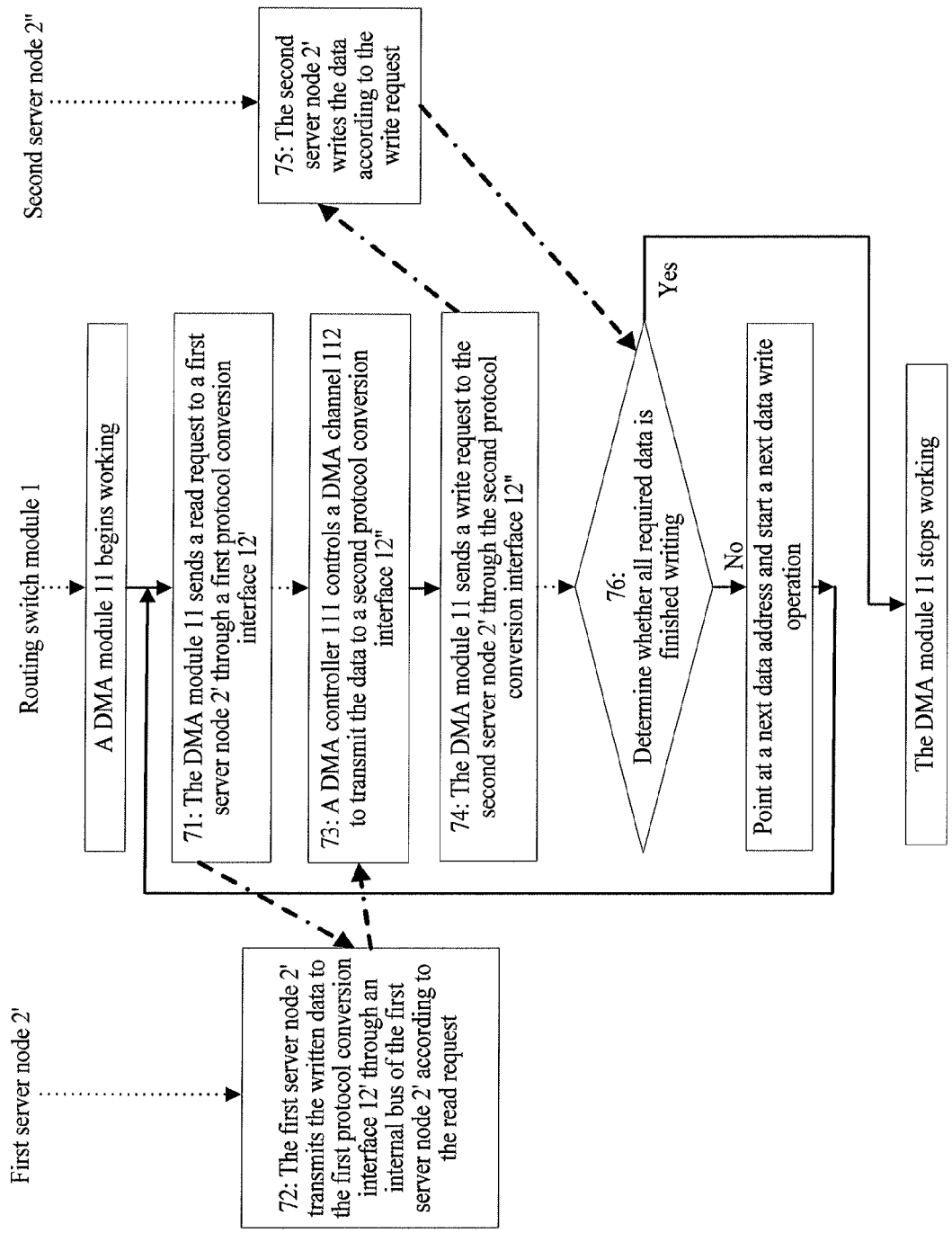
FIG. 7 is a flow chart of implementing data write access through a routing switch apparatus according to another embodiment of the present disclosure.

Alternatively, the process that the first server node 2' writes the data into the second server node 2" through the routing switch apparatus 1 includes the following steps, as shown in FIG. 7. 71: The DMA module 11 sends a read request to the first server node 2' through the first protocol conversion interface 12'. 72: The first server node 2' transmits the written data to the first protocol conversion interface 12' through an internal bus of the first server node 2' according to the read request. 73: The DMA controller 111 controls the DMA channel 112 to transmit the data to the second protocol conversion interface 12". And then, 74: The DMA module 11 sends a write request to the second server node 2' through the second protocol conversion interface 12". 75: The second server node 2' writes the data according to the write request. Finally, 76: Determine whether all required data is finished writing; if not, acquire next data.

It can be known from the foregoing description that, a process that the second server node 2" reads out the data from the first server node 2' through the routing switch apparatus 1 or a process that the second server node 2" writes the data into the first server node 2' through the routing switch apparatus 1 is similar to the progresses in the foregoing description. Similarly, when the network switch system has more routing switch apparatuses and network nodes, the processes of data access between them are basically the same as the foregoing processes. Therefore, in the embodiment of the present disclosure, in the routing switch method in the network switch system, the routing switch apparatus replaces a network switch in the prior art, so that cross-node memory access and IO space access are enabled to be directly performed rather than through a proxy, thereby reducing the delay of the cross-node memory access and IO space access, and improving overall performance of the system.

Persons of ordinary skill in the art may be aware that, with reference to the embodiments disclosed in the application, the described units and algorithm steps of each example may be implemented by using electrical hardware or a combination of computer software and electrical hardware. Whether these functions are executed in a manner of hardware or software depends on particular application and design constraint conditions of the technical solutions. Persons skilled in the art can use different methods to implement the described functions for each particular application, but it should not be considered that the implementation goes beyond the scope of the present disclosure.

It can be clearly understood by persons skilled in the art that, for the purpose of convenient and brief description, for a detailed working process of the foregoing described system, apparatus, and unit, reference may be made to the corresponding process in the foregoing method embodiments, which is not repeatedly described here again.

In several embodiments provided in the application, it should be understood that the disclosed system, apparatus, and method may be implemented in other manners. For example, the foregoing described apparatus embodiments are merely schematic. For example, the unit division is merely logical functional division and can be other division manners in actual implementation. For example, multiple units or components can be combined or can be integrated into another system, or some features can be ignored or not performed. Furthermore, the shown or discussed mutual coupling or direct coupling or communication connection may be accomplished through some interfaces, and indirect coupling or communication connection between apparatuses or units may be electrical, mechanical, or in other forms.

The units which are described as separate components may be or may not be physically separated. Components shown as units may be or may not be physical units, that is, may be located at one place, or may also be distributed to multiple network units. Some or all of the units in them may be selected to achieve the objectives of the solutions of the embodiments according to actual requirements.

In addition, each functional unit in each embodiment of the present disclosure may be integrated in one processing unit, and may also exist as each separate physical unit, and two or more than two units may also be integrated in one unit.

If the function is implemented in a form of a software functional unit and be sold or used as an independent product, the function can be stored in a computer readable storage medium. Based on such understanding, the technical solution of the present disclosure essentially or the part that makes contributions to the prior art or the part of the technical solutions may be represented in the form of a software product. The computer software product may be stored in a storage medium and include several instructions to instruct a computer device (such as a personal computer, a server, or a network device) to perform all or a part of the steps of the method described in each embodiment of the present disclosure. The foregoing storage medium includes various mediums that can store program codes, such as a USB disk, a removable hard disk, a read-only memory (ROM, Read-Only Memory), a random access memory (RAM, Random Access Memory), a magnetic disk, or a compact disk.

The foregoing description is merely illustrative, but is not intended to limit the protection scope of the present disclosure. All the variations or replacements that can be easily thought of by persons skilled in the art within the disclosed technical scope of the present disclosure should fall within the protection scope of the present disclosure. Therefore, the protection scope of the present disclosure should be subject to the protection scope of the claims.

What is claimed is:

1. A routing switch apparatus for facilitating direct memory access between a first server and a second server included in a computing system, comprising:
   a direct memory access module,
   a first protocol conversion interface and a second protocol conversion interface, wherein the first protocol conversion interface connects to the first server, and the second protocol conversion interface connects to the second server, the direct memory access module respectively connects to the first protocol conversion interface and the second protocol conversion interface;
   the direct memory access module is configured to: obtain an access parameter, wherein the access parameter comprises a starting address of data on the first server, a size of the data, and a data buffer of the second server into which the data is to be written;
   read the data from a memory of the first server through the first protocol conversion interface according to the starting address of data on the first server and the size of the data;
   write the data into the second server through the second protocol conversion interface according to the data buffer of the second server into which the data is to be written;
   the first protocol conversion interface is configured to convert a communication protocol of the data transmitted between the first server and the direct memory access module; and
   the second protocol conversion interface is configured to convert a communication protocol of the data transmitted between the second server and the direct memory access module.

2. The routing switch apparatus according to claim 1, wherein the direct memory access module comprises:
   a direct memory access controller; and
   a direct memory access channel; wherein
   the direct memory access controller is configured to control connection between the direct memory access channel and the first protocol conversion interface and control connection between the direct memory access channel and the second protocol conversion interface according to configuration information.

3. The routing switch apparatus according to claim 2, wherein the direct memory access module further comprises a storage used as a buffer of the direct memory access channel.

4. The routing switch apparatus according to claim 1, wherein the protocol conversion interface comprises:
- a fast bus protocol functional block configured to perform data exchange with the external network node through a fast bus link;
- a local bus interface functional block, connected to the fast bus protocol functional block and configured to perform internal data transmission of the routing switch apparatus;
- a register, connected to the fast bus protocol functional block and the local bus interface functional block, wherein the register stores an instruction used for configuring the fast bus protocol functional block and the local bus interface functional block; and
- a control functional block, connected to the fast bus protocol functional block and the local bus interface functional block and configured to control performance and operations of the protocol conversion interface.

5. A network switch system, comprising:
- a first server, a second server and a routing switch apparatus, wherein the routing switch apparatus is connected to the first and the second server through a fast bus link, and the routing switch apparatus comprises a direct memory access module, a first protocol conversion interface and a second protocol conversion interface, the first protocol conversion interface connects to the first server, and the second protocol conversion interface connects to the second server, the direct memory access module respectively connects to the first protocol conversion interface and the second protocol conversion interface;
- the direct memory access module is configured to: obtain an access parameter, wherein the access parameter comprises a starting address of data on the first server, a size of the data, and a data buffer of the second server into which the data is to be written;
- read the data from a memory of the first server through the first protocol conversion interface according to the starting address of data on the first server and the size of the data;
- write the data into the second server through the second protocol conversion interface according to the data buffer of the second server into which the data is to be written;
- the first protocol conversion interface is configured to convert a communication protocol of the data transmitted between the first server and the direct memory access module; and
- the second protocol conversion interface is configured to convert a communication protocol of the data transmitted between the second server and the direct memory access module.

6. The network switch system according to claim 5, wherein each server further comprises a slot complying with fast bus link standards, and the routing switch apparatus further comprises a slot complying with the fast bus link standards.

7. A routing switch method performed by a routing switch apparatus for facilitating direct memory access between a first server and a second server included in a computing system, wherein the routing switch apparatus at least comprises a direct memory access module, a first protocol conversion interface and a second protocol conversion interface, the first protocol conversion interface is configured to convert a communication protocol of data transmitted between the first server and the direct memory access module, and the second protocol conversion interface is configured to convert a communication protocol of data transmitted between the second server and the direct memory access module; the method comprises:
- acquiring, by the direct memory access module, an access parameter through a configuration interface, wherein the access parameter comprises a starting address of data on the first server, a size of the data, and a data buffer of the second server into which the data is to be written;
- reading, by the direct memory access module and according to the starting address of data on the first server and the size of data, the data from a memory of the first network node through the first protocol conversion interface; and
- writing, by the direct memory access module, the data into the second server through the second protocol conversion interface according to the data buffer of the second server into which the data is to be written.

8. The method according to claim 7, wherein the direct memory access module comprises a direct memory access controller and a direct memory access channel, wherein the method further comprises:
- controlling, by the direct memory access controller, connection between the direct memory access channel and the first protocol conversion interface according to configuration information; and
- controlling, by the direct memory access controller, connection between the direct memory access channel and the second protocol conversion interface according to configuration information.

9. The method according to claim 7, wherein the configuration interface is a fast bus protocol interface or a system management bus interface.

* * * * *